(12) United States Patent
Scott et al.

(10) Patent No.: US 12,560,428 B2
(45) Date of Patent: Feb. 24, 2026

(54) SETTLEMENT MONITORING SYSTEM AND METHOD

(71) Applicant: Osprey Measurement Systems LTD, East Sussex (GB)

(72) Inventors: Daniel Scott, Uckfield (GB); Peter Scott, East Sussex (GB)

(73) Assignee: Osprey Measurement Systems LTD, East Sussex (GB)

( * ) Notice: Subject to any disclaimer, the term of this patent is extended or adjusted under 35 U.S.C. 154(b) by 330 days.

(21) Appl. No.: 17/640,413

(22) PCT Filed: Sep. 4, 2020

(86) PCT No.: PCT/EP2020/074867
§ 371 (c)(1),
(2) Date: Mar. 4, 2022

(87) PCT Pub. No.: WO2021/044032
PCT Pub. Date: Mar. 11, 2021

(65) Prior Publication Data
US 2022/0316873 A1 Oct. 6, 2022

(30) Foreign Application Priority Data
Sep. 4, 2019 (GB) ..................................... 1912712

(51) Int. Cl.
*G01B 13/06* (2006.01)
*G01B 5/00* (2006.01)
(Continued)

(52) U.S. Cl.
CPC ......... *G01B 13/065* (2013.01); *G01B 5/0014* (2013.01); *G01B 13/24* (2013.01); *G01C 5/04* (2013.01)

(58) Field of Classification Search
CPC ................................ G01C 5/04; G01B 13/065
See application file for complete search history.

(56) References Cited

U.S. PATENT DOCUMENTS 5,827,963 A * 10/1998 Selegatto ................. G01N 9/26
73/32 R
2011/0174497 A1 7/2011 Den Boer et al.
2012/0078519 A1* 3/2012 Robotti .................... G01C 7/02
702/5

FOREIGN PATENT DOCUMENTS

CN 102620715 A 8/2012
CN 102768035 A 11/2012
(Continued)

OTHER PUBLICATIONS

Machine translation of JPS60-235012A (Year: 1984).*

*Primary Examiner* — Walter L Lindsay, Jr.
*Assistant Examiner* — Andrew V Do
(74) *Attorney, Agent, or Firm* — Jacob M. Ward; Ward Law Office LLC

(57) ABSTRACT
A settlement monitoring system 1 for a construction site 400, the system 1 comprising an elongate liquid vessel 100, a continuous body of liquid 110 within the vessel 100, a first sensor 201 housed within a first portion of the vessel, and at least one additional sensor 202-206 housed within a second portion of the liquid vessel 100, wherein the sensors 201-206 are submerged within the liquid 110 and each sensor 201-206 is capable of detecting a pressure of the liquid 110, wherein in use the first portion of the liquid vessel 100 is configured to be situated at a known reference point of the site 400, the second portion is configured to be embedded within the ground 416, and the pressures are communicated to a surface system 308, the surface system 308 being configured to record the pressures.

6 Claims, 2 Drawing Sheets

(51)  Int. Cl.
    G01B 13/24        (2006.01)
    G01C 5/04         (2006.01)

(56)              References Cited

FOREIGN PATENT DOCUMENTS

| CN | 108981655 A | 12/2018 |
| JP | S60235012 A | 11/1985 |

* cited by examiner

SETTLEMENT MONITORING SYSTEM AND METHOD

TECHNICAL FIELD

The present disclosure relates to a movement monitoring system and method, for example a settlement monitoring system and method, and is particularly, although not exclusively, concerned with a settlement monitoring system using liquid pressure to determine the vertical separation between locations.

BACKGROUND

A large proportion of construction takes place on soils, which are known to deform in response to applied loads. As such, it is important to measure the behaviour of such soils before, during and after construction. Systems exist which measure the deformation behaviour of soil. Given that construction projects often run to tight schedules, it is desirable that such systems can be quickly installed and, if possible, uninstalled.

Similarly, given that these sites are often at remote and dangerous locations, it is undesirable for an operator to need to visit each site to take readings manually. Additionally, manual readings are costly and produce temporally sparse data.

STATEMENTS OF INVENTION

According to an aspect of the present invention, there is provided a movement monitoring system comprising an elongate liquid vessel, a continuous body of liquid within the liquid vessel, a first sensor housed within a first portion of the liquid vessel, and at least one additional sensor housed within a second portion of the liquid vessel. The sensors are submerged within the liquid and each sensor is capable of detecting a pressure of the liquid local to the sensor, wherein in use the first portion of the liquid vessel is configured to be situated at a known reference point, the second portion is configured to be attached to or embedded within a structure, and the pressure values detected by each sensor are communicated to a processor, the processor being configured to store and/or process the pressure values.

The structure may be an earth material. The structure may be an engineering structure. The known reference point may be an absolute reference point. The known reference point may be a known location of a site at which the movement monitoring system is installed.

The first portion may be configured in use to be fixed above ground. The first portion may be disposed at an end of the vessel. The system may comprise a communication cable.

The vessel may be sealed. The vessel may be filled with liquid. The vessel may not contain pockets of air or other undissolved gases. The sensors may additionally comprise temperature sensors.

The vessel may comprise a sealed volume of compressible media. The sealed volume of compressible media may be a closed-cell silicone foam.

The communication cable may be a single cable digital bus. The sensors may be fixed to the walls of the vessel. At least one of the additional sensors may be housed within a third portion of the liquid vessel.

The processor may be comprised within a surface system. The processor may be configured to calculate the vertical separation between the first sensor and the at least one additional sensor using the pressures. The processor may be configured to process the pressure values into a movement profile for the structure.

According to another aspect of the present disclosure there is provided a method of monitoring ground movement using a ground movement monitoring system, the system comprising a surface system, an elongate liquid vessel, a continuous body of liquid within the vessel, a first sensor housed within a first portion of the vessel and at least one additional sensor housed within a second portion of the vessel. The sensors are submerged within the liquid and each sensor is capable of detecting a pressure of the liquid. The method comprises installing the system such that the first portion of the vessel is located at a known location and the second portion is embedded within the ground; configuring each sensor to determine a pressure of the liquid; communicating the pressures to the surface system; and calculating the depth of the at least one additional sensor.

According to another aspect of the present disclosure, there is provided a ground movement monitoring system for a construction site, the system comprising an elongate liquid vessel, a continuous body of liquid within the vessel, a first sensor housed within a first portion of the vessel and at least one additional sensor housed within a second portion of the liquid vessel. The sensors are submerged within the liquid and each sensor is capable of detecting a pressure of the liquid. In use, the first portion of the liquid vessel is configured to be situated at a known reference point of the site, the second portion is configured to be embedded within the ground, and the pressures are communicated to a surface system, the surface system being configured to record the pressures.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
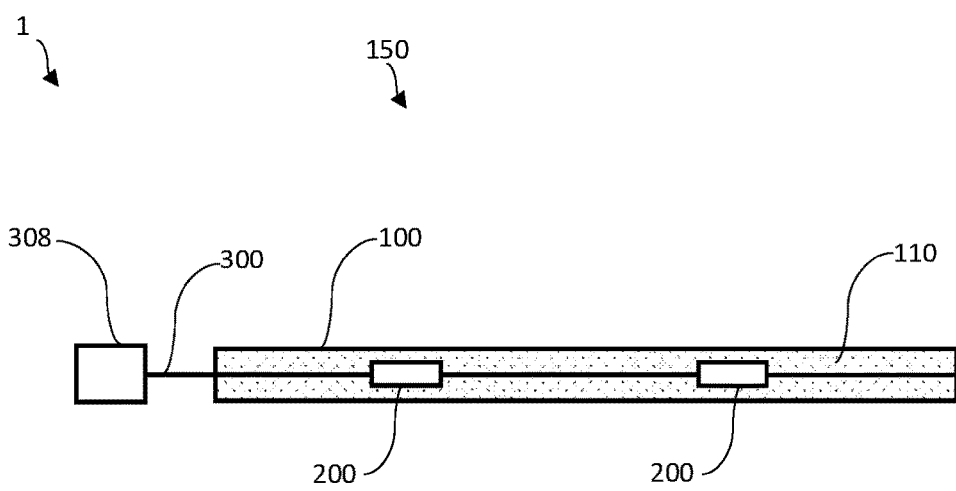
FIG. 1 is a schematic representation of a movement monitoring system.

With reference to FIG. 1, a movement monitoring system 1 for measuring soil deformation comprises a liquid vessel 100, a liquid 110, two sensors 200, a communication cable 300 and a surface system 308. The pressure sensors 200 are submerged within the liquid 110, the liquid 110 being static or stationary within the liquid vessel 100.

The vessel 100, comprising the sensors 200, the communication cable 300 and the liquid 110, may be termed the vessel assembly 150.

The liquid vessel 100 is elongate, for example a tube, pipe or similar, and is sealed and impermeable such that the liquid 110 is not able to leave the vessel 100 through either its ends or its walls. The vessel 100 may be of any shape, for example of circular transverse cross section, and may be made of any material suitable for the current purpose, for example medium-density polyethylene (MDPE).

The liquid 110 is a substantially incompressible liquid, with a known density and coefficient of thermal expansion. The liquid 110 in the vessel 100 forms a hydraulically continuous liquid body such that the sensors 200 are submerged within the same body of liquid. This same body of liquid may extend to both ends of the vessel 100, and fills any point within the vessel 100 between those ends. The vessel 100 is filled by the liquid 110 which may be de-aired, i.e. there may be no air or any other undissolved gas in quantities that may affect the readings of the sensors 200 in different orientations of the vessel 200, e.g. pockets of gas do not accumulate at the uppermost extremity of the vessel 100. The liquid 110 may be any suitable liquid for this application, for example, existing in the liquid phase at typical environmental temperatures, not acting to corrode or degrade any components of the system, and having properties that remain constant over time. In installations where fire-safety is required, the liquid 110 may be water. In geotechnical installations, the liquid 110 may be an environmentally friendly bio-degradable Glycol-based solution.

Each sensor 200 comprises a pressure sensor, which is capable of determining the pressure of the liquid 110 at the location of the sensor 200. Each pressure sensor may be any suitable type of pressure sensor for the present purpose, for example an absolute pressure sensor or a gauge pressure sensor. Each sensor 200 may additionally comprise a temperature sensor which is capable of determining the temperature of the liquid 110 in the vessel 100 at the location of the sensor 200. Each sensor 200 additionally comprises at least one port (not shown) into which the communication cable 300 can be inserted and connected. Each sensor 200 is of sufficiently small dimensions and shape that it is able to fit within the inner dimensions of the vessel 100 to allow the liquid body to remain continuous around it, i.e. each sensor 200 does not completely fill the inner dimensions of the vessel 100.

Each sensor 200 may additionally comprise a means of fixation to the vessel 100, such as outwardly-biased fixation elements (not shown), which are configured to grip onto the vessel interior without penetrating or piercing the vessel walls. Alternatively, a direct means of fixation for each sensor 200 may not be necessary. Each sensor 200 may be held in place by the communication cable 300.

The sensors 200 may be connected in series by means of the communication cable 300 to the surface system 308, such as a data logging device or processor. The communication cable 300 may be a single cable digital bus. The communication cable 300 protrudes from the vessel 100 at one end in a fluid-tight manner such that no liquid 110 may escape and no air may enter. Alternatively, the communication cable may protrude from the vessel 100 at any point along its length, according to the exact configuration of the vessel assembly 150 and the system 1.

The surface system 308 may be any device configured to record the pressure, and optionally temperature, measured by each sensor 200. The surface system 308 may comprise a processor. The surface system 308 may be any device configured to send a 'read' command over the communication cable 300, and record the return from the sensors 200. The read command may be automatically triggered by a timer, corresponding to a given frequency that may be determined upon set-up of the system, an event, such as a sensor triggering an alert to prompt a reading, or a command from a user, the user being either local or remote. The results of the read command may be stored on local memory, or alternatively communicated to a location remote from the construction site 400, for example by means of a radio or cabled network connection.

Whilst the illustrated embodiment describes a surface system 308 for measuring soil deformations, the surface system 308 need not necessarily be situated at the surface and may be embodied as a local or remote system, as appropriate for the particular application.

The vessel assembly 150 may comprise any number of additional sensors 200, the additional sensors 200 also being connected in series to the surface system 308.

Figure 2:
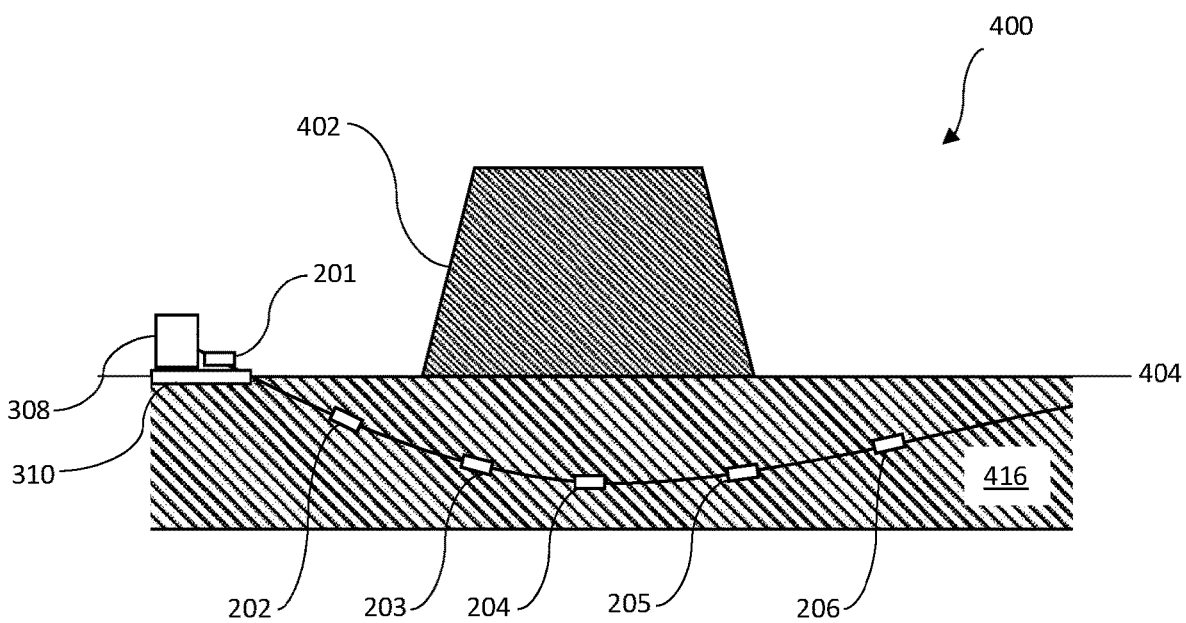
FIG. 2 is a schematic representation of a movement monitoring system having been installed at a construction site.

With reference to FIG. 2, the movement monitoring system 1 in the illustrated embodiment is described having been installed at a construction site 400 prior to commencement of construction. FIG. 2 shows a schematic representation of the construction site 400 after commencement of construction, such that the vessel assembly 150 is at least partially buried in the soil 416 beneath the construction site 400. The construction site 400 comprises a structure 402, soil 416 and a ground level 404. For simplicity, only the sensors 201-206 and communication cable 300 of the vessel assembly 150 are shown in FIG. 2. It should be understood however that all features previously disclosed in relation to the vessel assembly 150 are additionally included, such as the vessel 100 and the liquid 110.

The vessel assembly 150, comprising six sensors 201-206, has been at least partially embedded beneath a ground level 404 of the construction site 400. The vessel assembly 150 has been embedded such that a first sensor 201 of the vessel assembly 150, disposed within a first portion of the vessel assembly 150, is situated at a known location or absolute reference point of the site, for example a known location with respect to a site datum. In the example of FIG. 2, the first sensor 201 is configured to be attached to a concrete slab 310, the exact vertical location of which is known by calibration with at least one other site datum. Alternatively, the first sensor 201 may be configured to be located at another known location on site, for example, to be located at a fixed point at a known depth of the construction site 400, or alternatively the location of the first sensor 201 may be determined by triangulation or trilateration, such as GPS. In this configuration, the first sensor 201 acts as a means of determining a reference pressure, against which the pressure of the additional sensors 202-206 are compared and calculations performed.

It is noted that the reference sensor need not necessarily be a first sensor 201 located at an end of the vessel assembly 150, but may instead be any sensor 200 of the vessel assembly 150, provided that its exact location is known. For example, in the case that the vessel assembly 150 comprises a large number of sensors 200, it may be desirable that the reference sensor is a sensor 200 from neither extremity of the vessel assembly 150, but instead a sensor 200 part way along the string of sensors 200, provided that its location is known as described above, e.g. the reference sensor part way along the vessel is configured to sit above the ground level 404 of the construction site 400.

A second portion of the vessel assembly 150, comprising at least one additional sensor 202-206 is located in the soil 416, beneath the ground level 404 of the construction site 400. The position of each sensor 202-206 along the length of the vessel assembly 150 may have been selected in order that each sensor 202-206 is at a location of importance, or alternatively the sensors 202-206 may each be separated by a fixed distance, e.g. 1 metre. The end of the vessel assembly 150 distal to the first sensor 201 need not necessarily comprise an additional reference sensor however in some configurations this may be desirable. As such, in some configurations, the end of the vessel assembly 150 distal to the first sensor 201 may also comprise a reference sensor which is configured to be at a known location, for example above ground level.

Each of the sensors 201-206 is immersed within the continuous liquid 110, such that each sensor 201-206 is capable of determining the pressure of the liquid 110 at its location. Each sensor 201-206 may additionally be capable of determining the temperature of the liquid 110 at its location.

The sensors 201-206 are connected together in series and to a surface system 308 by means of a communication cable 300, in this example a single cable digital bus. The single cable digital bus is capable of transmitting data from the sensors 201-206 simultaneously to the surface system 308, and additionally capable of transmitting a read command to the sensors 201-206.

It is known that the pressure, P, in a static liquid is given by:

$$P = \rho g h$$

where $\rho$ is the density of the liquid, g is acceleration due to gravity and h is the vertical distance between the uppermost surface of the liquid and the location within the liquid at which the pressure is measured. Similarly, it is known that the pressure of the liquid is not dependent upon the geometry of the vessel in which it is contained, except for its vertical dimension in the configured state. As such, the cross sectional geometry of the vessel 100 does not affect the pressure of the liquid 110.

The pressure $P_{201}$ of the liquid at the location of sensor 201 is therefore:

$$P_{201} = \mu g h_{201}$$

where $h_{201}$ is the vertical depth of the liquid body above the first sensor 201. Similarly, the pressure $P_{204}$ of the liquid at the location of sensor 204 is:

$$P_{204} = \mu g h_{204}$$

where $h_{204}$ is the depth of liquid above the sensor 204. By rearranging for $h_{201}$ and $h_{204}$ and subtracting $h_{201}$ from $h_{204}$, the vertical separation $\Delta h$ between the first sensor 201 and the additional sensor 204 can be calculated:

$$\Delta h = h_{204} - h_{201} = \frac{P_{204} - P_{201}}{\rho g}$$

additional sensor 204 can be calculated:

Given that the pressures $P_{201}$ and $P_{204}$ are measured by the sensors 201, 204, it is therefore possible to calculate the vertical separation $\Delta h$ between the sensors 201, 204. Additionally, given that the first sensor 201 is at a known location, its absolute vertical location $H_{201}$ is known, for example by means of measurement from a site datum. Calculation of the absolute vertical location, $H_{204}$, of the sensor 204 is thus possible:

$$H_{204} = H_{201} - \Delta h$$

This calculation is repeated for each sensor 202-206 to determine the absolute vertical location, or depth, of each sensor 202-206.

It is therefore possible to determine the vertical dimension of the deformation behaviour of the ground at a construction site 400 over time, by means of the system 1 of the present disclosure.

It is noted that the depth of liquid 110 above the first sensor does not affect the calculation, provided that both sensors are submerged within the same, hydraulically continuous body of liquid 110. The skilled person will understand that similar calculations will be possible depending on the exact configurations of the vessel 100, the liquid 110 and sensors 202-206 in an installed state.

These calculations may be performed by the surface system 308, and the calculated depth of each sensor 200 may be communicated to a remote location or stored by the surface system 308 for future retrieval. Alternatively the surface system 308 may store the raw data for future retrieval, or may communicate the raw data to a remote location for calculations to be performed elsewhere.

Temperature Fluctuations

In some installation environments, the temperature at the construction site 400 may fluctuate, for example due to transition from day to night and vice versa, or, for installations over a longer duration, transitions between seasons. As a result of these construction site temperature fluctuations, components of the system 1 of the present disclosure may also change temperature. This may have an effect on the operation of the system 1.

The liquid 110 of the system 1 will have a coefficient of thermal expansion, meaning that as its temperature varies, so does its density. This may result in a variation in pressure measurements according to the temperature of the liquid 110, and subsequently incorrect calculations of depth. In order to compensate for these fluctuations in temperature, the sensor 200 may comprise a temperature sensor. Any measurement of pressure performed by the sensor 200 may be accompanied by a measurement of temperature, which, along with knowledge of the coefficient of thermal expansion of the liquid 110, can be used to account for changes in density of the liquid 110. As such, the variation in liquid density with liquid temperature can be corrected for.

Similarly, temperature fluctuations of the material of the vessel 100 may cause changes in its dimensions, for example its inner diameter, leading to variations in pressure of the liquid in the vessel 100. To mitigate this factor, the vessel assembly 150 may additionally comprise a sealed volume of a compressible media (not shown), for example a closed-cell foam, preferably a closed-cell silicone foam. This sealed volume of compressible media may be impermeable to the liquid 110. This sealed volume of compressible media may be disposed radially and circumferentially inwardly of the vessel 100, such that this foam complies with the thermal expansion and contraction of the vessel 100 to maintain a substantially constant inner diameter and thus volume for the liquid body to occupy. In this manner, any expansion or contraction of the vessel 100 due to temperature fluctuations can be mitigated. Alternatively, portions of the sealed volume of compressible media may be attached to the communication cable 300 between sensors 200, such that each portion of communication cable 300 between pairs of adjacent sensors 200 may have a portion of sealed volume compressible media attached.

It is possible that the vessel assembly 150 may vary in temperature along its length, such that, for example, a portion of the vessel 100 and liquid 110 nearer or above the ground level 404 may be warmer or cooler than a portion of vessel 100 and liquid 110 embedded within or deeper within the soil 416. In this case, it will be understood by the skilled person that it is possible to account for the varying density of the liquid along the length of the vessel by means of the temperature sensors as described above, and to calculate a depth adjusted for temperature variations accordingly. For example, by combining the temperature measurements of the liquid along the length of the vessel assembly 150 with the coefficient of thermal expansion of the liquid, a new vertical separation Δh can be calculated.

Installation

Figure 3:
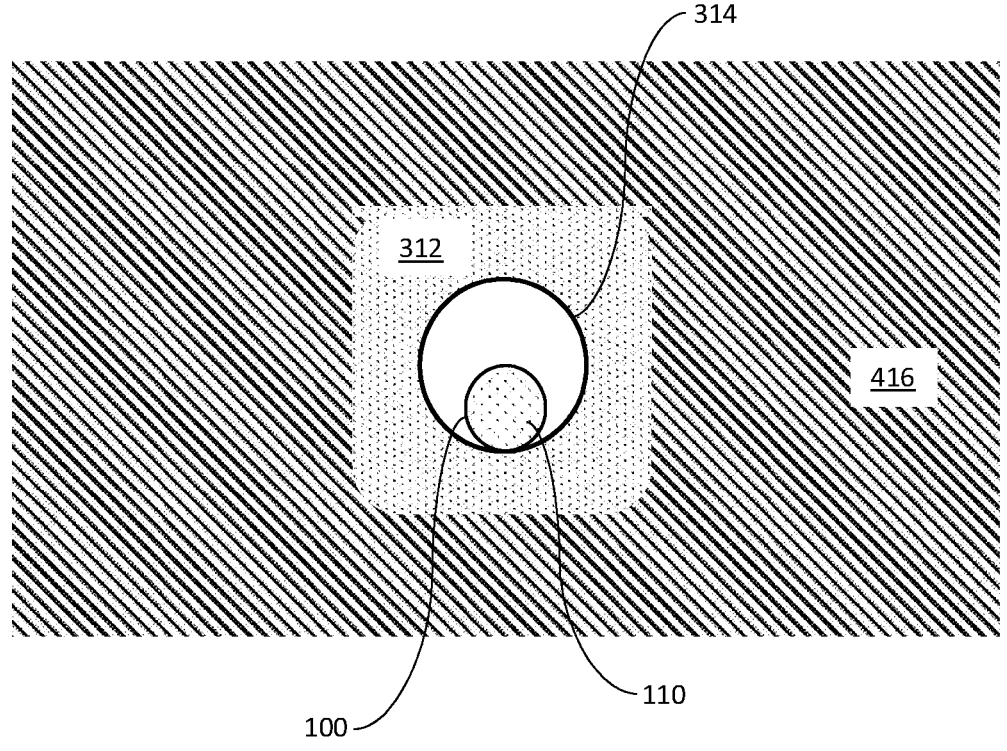
FIG. 3 is a cross sectional representation of a movement monitoring system having been installed.

The following description is provided in order to enable the installation of the movement monitoring system 1 of the present disclosure at a construction site 400. A cross section of one such installation is shown in FIG. 3.

A trench may be dug at the construction site 400. The path of the trench should include the locations of the construction site 400 which are to be subsequently monitored for ground movement. This path may run transversely to a linear construction site 400. Sand 312 may be deposited at the bottom of the trench. An access tube 314 may be laid along the path of the trench on top of the sand 312 in order to prevent the transmission of direct mechanical stresses to the vessel assembly 150. The access tube 314 may have internal dimensions larger than the external dimensions of the vessel 100. Additional sand 312 may be deposited in the trench before and after the laying of the access tube 314 such that the access tube 314 is surrounded by compressed sand 312 on all sides. The sand 312 bonds the movements of the soil 416 in the vicinity of the trench to the access tube 314. Alternatively, some installations may not require an access tube 314, in which case the vessel assembly 150 may be installed directly into the soil 316, or optionally installed within sand 312 within the soil 316. Alternatively, the vessel assembly 150 may be installed by direct attachment to a structure for which settlement is being measured, rather than in the soil 316 beneath the structure.

The vessel assembly 150 of the present disclosure may be pre-fabricated off site, such that the vessel assembly 150 is delivered in the assembled state. If, as described above, the system 1 is to be installed in an environment that is likely to experience temperature fluctuations sufficient to cause expansion and/or contraction of the vessel 100, a sealed volume of compressible media should be attached to the communication cable 300 during off site pre-fabrication of the vessel assembly 150. The vessel assembly 150 may be inserted into the access tube 314 at this point in the installation. Alternatively, construction may commence at the site 400 and the vessel assembly 150 of the present disclosure may subsequently be inserted when measurements of the deformation of the soil 316 are required. The trench may be covered over, e.g. with soil 416, and construction may commence or continue.

When the vessel assembly 150 is inserted within the access tube 314, the first portion of the vessel assembly 150 comprising the first sensor 201 should be located such that the first sensor 201 is situated at a known location of the construction site 400, e.g. a location of which the height is known. It may be desirable that this location is a concrete slab 310 with a reference datum pin, the concrete slab 310 being configured to sit in alignment with a ground level 404 of the construction site 400 and located in a part of the construction site 400 that will not undergo any sort of ground movement and is additionally remote from any possible construction damage. The first portion comprising the sensor 201 may sit, for example, flat and flush on the concrete slab 310. The second portion comprising the at least one additional sensor 202-206 may be situated within the access tube 314 and within the soil 416 for which movement is to be monitored.

The communication cable 300 emerging from an end of the vessel 100 may be connected to a surface system 308, which may be installed on the surface of the construction site 400 at an accessible location which is distant from any possible construction damage. It may be desirable that the surface system 308, connected by means of the communication cable 300 to the sensors 200, is proximal to the concrete slab 310 on which the first portion of the vessel 201, comprising the first sensor 201, is situated.

In some applications, it may be desirable that the exact location of each sensor 200 is adjusted to monitor the movement of a particular part of the construction site 400. In this case, the location of each sensor 200 within the vessel assembly 150 may be adjusted at the construction site 400 to match the separation of these parts of the construction site 400, rather than having a plurality of sensors 200 each separated by a set interval, e.g. 1 metre.

Initial conditions of the system 1 and the construction site 400 may be measured and determined upon set-up of the system 1. These may form a starting point from which subsequent ground movement is compared when determining the deformation behaviour of the soil 416 of the construction site 400. As described previously, the surface system 308 may be configured to send read commands according to a range of triggers.

The movement monitoring system 1 of the present invention may be removed once its purpose has been fulfilled. For example, after construction has been completed and ground movement is no longer being considered, the vessel assembly 150 may be withdrawn from the access tube 314 and the surface system 308 disassembled, before being used at a different construction site. Conversely, the movement monitoring system 1 may be installed at a construction site 400 only when measurements are required. For example, it may be possible for one movement monitoring system 1 to be rotated between multiple construction sites 400 to perform ground movement monitoring activities at a frequency required by the operators.

It is noted that the present system may alternatively be installed at a pre-existing access tube 314, which may have previously been fitted with an alternative movement monitoring system. In this way, the present system 1 can replace other movement monitoring systems in situ, by back-fitting to pre-existing access tubes 314, thus allowing the advantages of the present invention without incurring the additional cost and inconvenience of the digging of a new trench or laying of an access tube 314.

Advantages

The movement monitoring system 1 of the present disclosure confers several advantages on ground movement monitoring when compared with prior art systems.

The movement monitoring system 1 of the present disclosure does not require levelling or alignment of pressure sensors, as is often the case with prior art systems. The present system 1 may be inserted into a pre-existing access tube 314, and the exact orientation of each pressure sensor is not important in the determination of the pressure at the location of each pressure sensor; the vessel assembly 150 may be said to be rotationally invariant.

The vessel assembly 150 may be pre-fabricated such that on-site installation requires the insertion of the vessel assembly 150 into an access tube 314 and set-up of the surface system and reference point. This differs from prior art systems which may require that each pressure sensor be fixed to a slab of concrete cast into the trench where ground movement monitoring is to take place. Accordingly, the system 1 of the present disclosure is readily removable and relocatable.

Similarly, it is noted that the sensors 200 of the present system are all comprised within the same vessel 100, such that one vessel 100 is able to monitor the ground movement of a plurality of points. This differs from some prior art systems, which may require a separate vessel for each sensor and thus a separate vessel for each monitoring point. This allows for faster installation, lower likelihood of malfunctioning and lower set-up and operating costs.

Another advantage is in the feature that the vessel 100 may be sealed and does not require the presence of an above-surface reservoir at an end of the vessel 100. This has knock-on benefits when compared with prior art systems, which may require flushing-through during installation to remove air pockets, as well as the added inconvenience of an additional surface structure at the construction site.

Extension of Monitoring Length

In certain applications, it may be necessary to monitor ground movement over a large distance, longer than the typical length of the pre-fabricated lengths of vessel assembly 150 of the present disclosure. In this case, it is possible to connect multiple lengths of the vessel assembly 150 together, for example a first vessel assembly 150 with a second vessel assembly 150.

Each vessel 100 may have markings on its exterior to indicate the location of the sensors 200. One or more indicators, and thus sensors 200, of the first vessel assembly 150 may be aligned with one or more indicators, and thus sensors 200, of the second vessel assembly 150 by an operator. The first and second vessel assemblies 150 may then be mechanically connected, such that this alignment remains during installation and operation of the system 1. The aligned and connected first and second vessels 100 may then be installed inside the access tube 314 in the manner described above.

The first and second vessel assemblies 150 may share a common surface system 308, for example by both being connected to the same surface system 308. This may be achieved using a separate communication cable 300 for each of the first and second vessels, or alternatively by connecting the communication cables at the point at which the first and second vessel assemblies 150 adjoin, such that the data from the second vessel assembly 150 is able to be communicated to the surface system 308 by the communication cable 300 of the first vessel assembly 150, and/or vice versa. Alternatively, each of the first and second vessels 100 may be connected to its own surface system 308.

Whilst the present invention has been described largely in the context of monitoring ground movement at a construction site, it will be understood by the skilled person that the system 1 may also be implemented in 'above ground' applications not at a construction site. For example, the vessel assembly 150 may be attached to the inside of a tunnel in order to monitor the settlement along the inside of the tunnel lining. Alternatively, the system 1 may be used to monitor settlement along railway beds, by placing the vessel assembly 150 between the rails, or to monitor differential settlement of large structures such as oil tanks or large foundation slabs. In these applications, the system 1 may be configured in use such that the system 1 is substantially above ground, for example no part of the system 1 may be embedded within the ground. The vessel assembly 150 may be directly attached to the super-surface structure being monitored.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A movement monitoring system comprising:
an elongate liquid vessel;
a continuous body of liquid within the liquid vessel;
a first sensor housed within a first portion of the liquid vessel; and
at least one additional sensor housed within a second portion of the liquid vessel,
wherein the first sensor and the at least one additional sensor are each submerged within the liquid, the first sensor is capable of detecting a pressure and a temperature of the liquid local to the first sensor and the at least one additional sensor configured to detect a pressure and a temperature of the liquid local to the at least one additional sensor,
wherein in use:
the first portion of the liquid vessel is configured to be situated at a known reference point;
the second portion is configured to be attached to or embedded within a body of material;
pressure and temperature values detected by each sensor are communicated to a processor, the processor being configured to:
correct for variation in liquid density based on the detected temperatures; and
calculate a vertical separation between the first sensor and the at least one additional sensor based on the detected pressures and the corrected liquid densities;
and
wherein a surface system is configured to calculate the vertical separation between the first sensor and the at least one additional sensor using the pressures.

2. The movement monitoring system of claim 1, wherein the body of material comprises earth.

3. The movement monitoring system of claim 1, wherein the vessel does not contain pockets of air or other undissolved gases.

4. The movement monitoring system of claim 1, wherein at least one of the additional sensors is housed within a third portion of the liquid vessel.

5. The movement monitoring system of claim 1, wherein the processor is configured to process the pressure values into a movement profile for a structure.

6. A method of monitoring ground movement using a movement monitoring system, the system comprising:
a processor;
an elongate liquid vessel;
a continuous body of liquid within the liquid vessel;
a first sensor housed within a first portion of the liquid vessel; and
at least one additional sensor housed within a second portion of the liquid vessel,
wherein the first sensor and the at least one additional sensor are each submerged within the liquid, the first sensor is capable of detecting a pressure of the liquid local to the first sensor and the at least one additional sensor is configured to detect a pressure of the liquid local to the at least one additional sensor, the method comprising:

installing the system such that the first portion of the vessel is located at a known location and the second portion is attached to or embedded within a body of material;

configuring the first sensor and the at least one additional sensor to determine a pressure and a temperature of the liquid;

communicating the pressures and the temperatures to the processor;

correcting, at the processor, for variation in liquid density based on the detected temperatures;

calculating, at the processor, a vertical separation between the first sensor and the at least one additional sensor based on the detected pressures and the corrected liquid densities.

\* \* \* \* \*